US008181876B2

(12) United States Patent
Smith

(10) Patent No.: US 8,181,876 B2
(45) Date of Patent: May 22, 2012

(54) METHODS AND SYSTEMS FOR FORMING IMAGES OF MOVING OPTICAL CODES

(75) Inventor: Larry J. Smith, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 930 days.

(21) Appl. No.: 12/127,685

(22) Filed: May 27, 2008

(65) Prior Publication Data

US 2008/0223933 A1 Sep. 18, 2008

Related U.S. Application Data

(63) Continuation of application No. 11/122,790, filed on May 3, 2005, now Pat. No. 7,383,994.

(51) Int. Cl.
*G06K 7/10* (2006.01)
*G06K 9/32* (2006.01)
(52) U.S. Cl. .................. 235/454; 382/294
(58) Field of Classification Search ............ 235/454, 235/462.01–462.49; 382/254–308
See application file for complete search history.

(56) References Cited

U.S. PATENT DOCUMENTS

| | | | |
|---|---|---|---|
| 5,054,097 A * | 10/1991 | Flinois et al. .................. 382/294 |
| 5,354,977 A | 10/1994 | Roustaei |
| 5,545,886 A | 8/1996 | Metlitsky |
| 5,691,773 A * | 11/1997 | Wang et al. .................. 348/249 |
| 5,981,944 A | 11/1999 | Ito |
| 6,006,990 A | 12/1999 | Ye et al. |
| RE36,528 E | 1/2000 | Roustaei |
| 6,056,198 A | 5/2000 | Rudeen et al. |
| 6,123,261 A | 9/2000 | Roustaei |
| 6,758,399 B1 | 7/2004 | Brunelli et al. |
| 7,016,539 B1 * | 3/2006 | Silver et al. .................. 382/216 |
| 7,383,994 B2 | 6/2008 | Smith |
| 2002/0125411 A1 | 9/2002 | Christy |
| 2006/0163355 A1 | 7/2006 | Olmstead et al. |
| 2006/0249581 A1 | 11/2006 | Smith |

OTHER PUBLICATIONS

Burschka et al., "Recent Methods for Image-Based Modeling and Rendering," *IEEE Virtual Reality 2003 Tutorial 1*, Mar. 2003.
Goshtasby, Image Registration: Introduction, Wright State University and Image Fusion Systems Research, Jun. 27, 2004, 8 pp.
Neilsen, "Bibliography on Image Registration," http://hendrix.imm.dtu.dk/staff/fnielsen/bib/Nielsen2001Biblmage/Nielsen2001Biblmage.html, Apr. 25, 1995.
U.S. Appl. No. 11/122,790, "Methods and Systems for Forming Images of Moving Optical Codes," filed May 3, 2005.

* cited by examiner

*Primary Examiner* — Jamara Franklin
(74) *Attorney, Agent, or Firm* — Stoel Rives LLP

(57) ABSTRACT

A method aligns a second image of an object taken at a second time with a first image taken at a first time, wherein the object experiences motion relative to an imager between the first and second times. The images are formed of sets of pixels arranged horizontally and vertically in a pattern. The method operates on the pixels of the second image by performing a series of operations to affect an affine transformation without performing matrix arithmetic, preferably by table look-up. The method shifts the pixels of the second image vertically by a constant vertical offset, shifts the pixels of the second image horizontally by a constant horizontal offset, shears the second image horizontally by a skew factor, shears the second image vertically by a skew factor, scales the second image horizontally by a horizontal scale factor; and scale the second image vertically by a vertical scale factor.

16 Claims, 6 Drawing Sheets

510

610

METHODS AND SYSTEMS FOR FORMING IMAGES OF MOVING OPTICAL CODES

RELATED APPLICATIONS

This application is a continuation of U.S. patent application Ser. No. 11/122,790, entitled "Methods and Systems for Forming Images of Moving Optical Codes," filed May 3, 2005 (issuing as U.S. Pat. No. 7,383,994 on Jun. 10, 2008). The preceding application is incorporated herein by reference in its entirety.

TECHNICAL FIELD

The field of this disclosure relates generally but not exclusively to optical code readers, such as bar code readers, and more particularly to motion compensation for reading moving optical codes.

BACKGROUND

Today optical codes, such as bar codes, are ubiquitously found on or associated with objects of various types, such as the packaging of retail, wholesale, and inventory goods; retail product presentation fixtures (e.g., shelves); goods undergoing manufacturing; personal or company assets; and documents. By encoding information, a bar code typically serves as an identifier of an object, whether the identification be to a class of objects (e.g., containers of milk) or a unique item (e.g., U.S. Pat. No. 6,012,639). Bar codes consist of alternating bars (i.e., relatively dark areas) and spaces (i.e., relatively light areas). The widths of the bars and spaces are often set to encode a desired information sequence, as the pattern of bars and spaces represents a string of binary ones and zeros, wherein the width of any particular bar or space is an integer multiple of a specified minimum width, which is called a "module" or "unit." Thus, to decode the information, a bar code reader must be able to reliably discern the locations of edges demarking adjacent bars and spaces from one another across the entire length of the bar code.

Generally speaking, two typical classes of optical scanning equipment are utilized to generate image data, from which a bar code can be decoded. A first class of optical scanning equipment comprises a laser illumination source and a photodetector positioned to measure the reflection of the laser beam off the bar code. The laser produces a focused beam spot on a small area of the bar code. As the laser spot and the bar code move relative to each other, such that the spot is scanned across the bar code, a photodetector detects the laser light reflected off the bar code and produces an electrical signal whose magnitude is related to the optical power of the reflected signal. Thus, as the spot scans across the bar code, the photodetector generates an electrical signal whose variations over time at least roughly correlate to the spatial pattern of bars and spaces in the bar code. A second class of optical scanning equipment utilizes a camera or other imager to form an image of all or part of a bar code. In that case, the illumination source may be diffuse across the entire bar code, and the bar code may be imaged using a charge-coupled device (CCD) camera or a CMOS (complementary metal-oxide-semiconductor) imager, either of which forms an electronic image of the bar code. That electronic image can be sampled in the direction of the major axis of the bar code to generate a virtual scan line signal, which is like the scan line signal generated with a scanning laser spot. In any event, the result is an electronic scan line signal, which can be decoded to ascertain the information encoded into the bar code.

Flaws in the image of the bar code can make it impossible to read a sufficient portion of the bar code to enable decoding. Flaws can arise, for example, from the use of flood-type lighting with an imaging camera, especially when attempting to read shiny bar code labels and, in particular, shiny curved labels as found on beverage cans. As shown in FIG. 1, the specular reflection of the lighting source is seen as a bright "washed-out" region in the bar code image when the metal can is held at any angle close to normal at the optical axis. This problem and some solutions to it are described in commonly owned U.S. patent application Ser. No. 11/044,825, entitled "Data Reader and Methods for Imaging Targets Subject to Specular Reflection," filed Jan. 26, 2005. This problem also can occur to a milder extent with the use of a laser scanner, as the illumination beam and the collected image field of view are narrower than with a camera imager. Techniques for dealing with flawed images of a bar code are complicated by the fact that the bar code may be moving across the reader's field of view.

Bar codes are just one example of the many types of optical codes in use today. In general, optical codes encode useful, optically-readable information about the items to which they are attached or otherwise associated. While bar codes generally encode information in a binary format across one dimension, higher-dimensional optical codes are also possible, such as, two-dimensional matrix codes (e.g., MaxiCode) or stacked codes (e.g., PDF 417). Decoding optical codes in general poses the same challenges, such as specular glare rendering part of a code's image flawed as well as motion of the code with respect to the imager, posed by bar codes in particular.

SUMMARY

The present invention includes methods and systems for improved imaging of such things as optical codes in motion. Certain embodiments of the methods and systems can form a decodable composite image of an optical code that experiences motion. The composite image is formed of a first image and a second image of optical code, whereby the optical code may undergo relative motion between the times at which the first and second images are formed.

As used herein, the term "image" means not only a full image, which typically consists of a grid of pixels in a rectangular arrangement, but also partial images, such as, for example, those formed by measuring a reflection pattern from a narrow scan line across some or all of an object.

Details concerning the construction and operation of particular embodiments are set forth in the following sections with reference to the below-listed drawings.

DETAILED DESCRIPTION OF EMBODIMENTS

A. Introduction

Figure 1:
FIG. 1 is a picture showing a beverage can bar code label with glare in the upper half.

With reference to the above-listed drawings, this section describes particular embodiments and their detailed construction and operation. As one skilled in the art will appreciate in light of this disclosure, certain embodiments are capable of achieving certain advantages over the known prior art, including some or all of the following: (1) the capability to form an image in the presence of partial blockage or distortion, such as specular glare, (2) the capability to form an image of an object in motion, (3) the ability to efficiently perform an affine transformation of one image relative to another, and (4) improved ability to decode optical codes, such as bar codes, on items, such as shiny beverage cans. These and other advantages of various embodiments will be apparent upon reading the remainder of this section.

According to one embodiment, a method forms a decodable composite image of an optical code that experiences motion. The method forms a first image of at least a first portion of the optical code at a first time and a second image of at least a second portion of the optical code at a second time, whereby the optical code may undergo relative motion between the first time and the second time. The method determines one or more of the following parameters of an affine transformation relating the second image to the first image: vertical offset, horizontal offset, horizontal skew factor, vertical skew factor, horizontal scale factor, and vertical scale factor. The method aligns one of the first and second images to the other of the first and second images by utilizing the determined parameters to implement the affine transformation, thereby forming an aligned image. Finally, the method combines elements of the aligned imaged and the other of the first and second images to form the decodable composite image of the optical code.

According to another embodiment, a system forms a decodable composite image of an optical code that experiences motion. The system comprises an imager, memory, and a processor. The imager has a field of view in which an optical code may be present. The imager forms a first image of at least a first portion of the optical code at a first time and a second image of at least a second portion of the optical code at a second time after the first time, whereby the optical code may undergo motion between the first time and the second time. In the memory are stored the first and second images. The processor is connected to the memory and comprises a correlation module, a transform module, and a combining module. The correlation module computes one or more cross correlations between the first and second images, and based upon the one or more correlations determines one or more of the following parameters of an affine transformation relating the second image to the first image: vertical offset, horizontal offset, horizontal skew factor, vertical skew factor, horizontal scale factor, and vertical scale factor. The transform module implements the affine transformation so as to align one of the first and second images to the other, thereby resulting in an aligned image. The combining module combines elements of the aligned imaged and the other image to form the decodable composite image of the optical code.

According to another embodiment, another method forms a decodable composite image of an optical code that experiences motion. That method forms a first image of at least a first portion of the optical code at a first time and a second image of at least a second portion of the optical code at a second time, whereby the optical code may undergo relative motion between the first time and the second time. The method computes one or more cross correlations between the first image and the second image and determines, based on the one or more cross correlations, one or more parameters of a transformation mapping between the first and second images. The method aligns one of the first and second images to the other of the first and second images by utilizing the determined parameters to implement the affine transformation, thereby forming an aligned image. Finally, the method combines elements of the aligned imaged and the other of the first and second images to form the decodable composite image of the optical code.

According to yet another embodiment, another method forms a decodable composite image of an optical code that experiences motion. That method forms at least two images of at least portions of the optical code at different times. The method determines one or more of the following parameters of an affine transformation relating the second image to the first image: vertical offset, horizontal offset, horizontal skew factor, vertical skew factor, horizontal scale factor, and vertical scale factor. The method predicts, based on the determined parameters, one or both of a location and orientation of the optical code at a future time and forms an image of at least a portion of the optical code at the future time. The method aligns the image formed at the future time to one of said at least two images formed at said sequence of times, by utilizing the determined parameters to implement the affine transformation, thereby forming an aligned image. The method combines elements of the aligned image and the image formed at the future time to form the decodable composite image of the optical code.

Figure 2:
FIG. 2 is a picture showing a beverage can bar code label with glare in the lower half, according to one embodiment.
Figure 3:
FIG. 3 is a picture showing FIGS. 1 and 2 combined without re-alignment to yield an unreadable composite image.
Figure 4:
FIG. 4 is a picture showing FIGS. 1 and 2 combined after re-alignment to yield a readable composite image, according to one embodiment.

As an example, FIGS. 1 and 2 show respective first and second images M and M' of a bar code on a metallic beverage can. The first image M, formed at a first time, has severe specular glare in its upper half, as might happen when the bar code is illuminated from a top light source at the first time. The second image M', formed at a second time, exhibits glare in its lower half, as might happen when the bar code is illuminated from a bottom light source at the second time. If the first image and the second image are combined without taking into account the relative movement of the bar code with respect to the imager between the first and second times, then the resulting combined image, which is illustrated in FIG. 3, may be difficult or impossible to decode. However, if the motion is compensated for, even if only partially, then the first and second images can be combined to yield a combined image, such as shown in FIG. 4, in which the bar code can more likely be decoded successfully.

Certain motion compensation techniques described herein generally involve determining the spatial relationship between the first and second images. That determination preferably involves selecting features in the first image M and recognizing those features in the second image M'. Feature selection and recognition algorithms, in particular cross-correlation algorithms, are described in subsection B of this section. Those algorithms yield parameters that characterize the spatial relationship between the first and second images. Using those parameters, the motion compensation techniques align the two images together, as described in subsection C. One preferred alignment technique implements an affine geometric transformation in a computationally parsimonious manner. Finally, aligned images can be spliced, stitched, merged, or otherwise combined to yield a decodable image.

Subsection D presents an example of an overall motion compensation technique applied to a shiny beverage can. Subsection E presents an alternative formulation of the technique based on virtual scan line data collection, as opposed to full image data.

B. Characterization of Spatial Relationship

Feature selection and recognition are preferred techniques to characterize the spatial relationship, e.g., movement caused by motion, between the first and second images. This can be done by analyzing one or more features in the respective images. As used herein, the term "feature" is meant to refer to one or more points in the image data. For example, a feature may be a pattern or object in an image. When a feature present in the first image M is recognized in the second image M', knowing the relative displacement of the feature in one image compared to the other informs the spatial relationship between the images.

The fact that bar codes represent information in a linear pattern lends itself to considering features to be bar code segments. One technique for selecting and recognizing such features is illustrated with reference to FIGS. 5 and 6, which are replica of the picture of the first and second images as shown in FIGS. 2 and 3, respectively, but with overlaid line segments 510 and 610. The line segments 510 and 610 indicate where cross correlations are performed to determine which line segments 510 on the first image M correspond to which line segments 610 on the second image M' and to determine the relative offsets that yield maximum cross-correlation. In this example, there are twenty line segments arranged in a pattern of four columns spaced 60 pixels apart by five rows spaced 80 pixels apart (from beginning to beginning of a line segment), and each line segment is 64 pixels long. That pattern is merely illustrative. More or less line segments may be utilized, other patterns are possible, and the size of the line segments can be varied. For example, the pattern of line segments 510 in the first image need not be the same pattern of line segments 610 in the second image. As another example, crisscross patterns of virtual scan line paths can be utilized.

Feature selection and recognition can be accomplished by computing a set of cross correlations between, on one hand, the pixel values along the line segments 510 on the first image M, and, on the other hand, the pixel values along the line segments 610 on the second image M'. By doing so, one can determine which, if any, line segments 510 on the first image M correlate strongly with which line segments 610 on the second image M' and the relative offset between correlating line segments yielding maximum correlation. In this way, the locations of matching features can be found in each image.

In most cases, the magnitude of motion between the images can be assumed to be small enough that a line segment 510 on the first image will only potentially correlate with the same corresponding line segment 610 in the second image. (e.g., each of the top left line segments may correlate with each other but not with any other line segments). The only question then is the relative offset between those corresponding line segments that correlate strongly enough with one another to register. That is, in fact, true of the example shown in FIGS. 5 and 6, where the following line segments were found to have a strong peak correlation: (0,2), (1,4), (2,1), and (3,3) (indicated in the form (column, row) where column=0, ..., 3, and row=0, ..., 4). In this example the peak correlation values for those line segments were found to be 0.987, 0.985, 0.97, and 0.976, respectively, at offsets of −8.029, −7.063, −8.036, and −8.059 pixels, respectively (the negative signs indicating that the bar code in the second image M' is generally translated vertically upward with respect to the bar code in the first image M). Results can vary depending upon the manner in which the cross correlations are computed. In this case, the correlations were computed over 32 pixels, i.e., $$c_{ij}(k) = \frac{1}{2\|M_{ij}\|} \sum_{n=0}^{31} M_{ij}(n) M'_{ij}(n+k) \tag{1}$$

where $M_{ij}$ and $M'_{ij}$ are pixel values on the (i,j) line segment of M and M'.

An alternative correlation technique utilizes post-decoding data, i.e., the sequence of bar and space values that can be decoded along the line segments 510/610, rather than raw pixel data. An advantage of correlating decoded bar code data rather than raw pixel data is that a good decoding process can reliably generate valid bar-space data in the presence of some noise and other distortions.

As a simplifying assumption, the correlations for a line segment can be ignored if any of the pixels on that line segment have an intensity greater than a maximum threshold, under the assumption that such a line segment is in a portion of the image where there is significant glare. Another simplification results from ignoring correlations less than a minimum threshold, such as 0.8, for example.

More generally, the images can be subdivided into regions, and a two-dimensional correlation technique can be utilized to measure the correlation between two-dimensional regions. That technique is computationally more demanding, but it is generally applicable to all types of images, including two-dimensional optical codes. Because bar codes encode data in only one dimension, simpler one-dimensional correlations, such as equation (1), can be taken in the direction of the data encoding, e.g., along the line segments 510/610. The one-dimensional technique is computationally less demanding and therefore more feasible for applications where decoding speed is important.

As another alternative, techniques other than correlation can be employed to select and recognize features in the images. For example, pattern recognitions techniques can be utilized. As still another alternative, given sufficient processing power, rather than analyzing portions or regions of images, the entire images may be processed and compared by correlative or non-correlative means to select and recognize matching features.

However determined, the locations of corresponding features in the two images may be used to determine the parameters of a transformation that maps the first image M to the second image M' or vice versa.

Any suitable technique for modeling three-dimensional motion in two-dimensional images may be utilized, including homographic, orthographic and para-perspective projections. However, those methods require application of individual matrix multiplications for each point in the image to be transformed, and even very fast computers at the time of this writing cannot easily perform such processing for these general models in real-time for most optical code reading applications.

With optical code images, two simplifying assumptions can be employed: (1) a bar code may be treated as a planar object and (2) foreshortening due to perspective change can be ignored. While the first assumption is not always strictly true (e.g., it becomes inaccurate for bar codes wrapped in the axial direction around small cylinders, such as beverage cans), that assumption allows changes between successive images of a bar code to be modeled as a simple two-dimensional geometric transformation. And while the second assumption is not always strictly true (e.g., if the bar code label is very close to the scanner and the user tilts or skews the label's normal direction, then the resulting perspective distortion may not be accurately modeled), ignoring foreshortening due to perspective change allows these changes to be modeled as an affine linear transformation. With an affine transformation, points map to points, lines map to lines, and ratios of distances along a line are preserved. An affine transformation accurately represents horizontal and vertical translation, rotation about an axis normal to the image plane, and size changes in vertical and horizontal directions due to varying depth away from the camera.

Under an affine transformation any point (x,y) in the first image M which moves to (x',y') in the second image M' is assumed to fit a relationship of the form:

$$x = x_1 y' + s_3 x' + s_5$$

$$y = x_2 y' + x_4 x' + s_6 \quad (2)$$

which can be restated in matrix notation as $$\begin{bmatrix} x \\ y \\ 1 \end{bmatrix} = \begin{bmatrix} s_3 & s_1 & s_5 \\ s_2 & s_4 & s_6 \\ 0 & 0 & 1 \end{bmatrix} \begin{bmatrix} x' \\ y' \\ 1 \end{bmatrix} \quad (3)$$

or $$[x \ y \ 1] = [x' \ y' \ 1] \begin{bmatrix} s_3 & s_4 & 0 \\ s_1 & s_2 & 0 \\ s_5 & s_6 & 1 \end{bmatrix} := [x' \ y' \ 1] S. \quad (4)$$

The form of equation (4) is convenient since it can be applied to any number of points desired in a single matrix operation:

$$\begin{bmatrix} x_0 & y_0 & 1 \\ x_1 & y_1 & 1 \\ \vdots & \vdots & \vdots \\ x_p & y_p & 1 \end{bmatrix} = \begin{bmatrix} x'_0 & y'_0 & 1 \\ x'_1 & y'_1 & 1 \\ \vdots & \vdots & \vdots \\ x'_p & y'_p & 1 \end{bmatrix} S. \quad (5)$$

The transform matrix S is preferably determined by choosing any three or more identifiable features that are not colinear and then determining their locations before and after their motion. In the case of three features, equation (5) can be solved for S by matrix inversion as follows:

$$S = \begin{bmatrix} x'_0 & y'_0 & 1 \\ x'_1 & y'_1 & 1 \\ x'_2 & y'_2 & 1 \end{bmatrix}^{-1} \begin{bmatrix} x_0 & y_0 & 1 \\ x_1 & y_1 & 1 \\ x_2 & y_2 & 1 \end{bmatrix}. \quad (6)$$

If more than three features are known, then equation (5) is overdetermined and can be solved for S using standard techniques, such as regression, least squares or recursive least squares.

Referring back to the cross correlation computations over predetermined line segments, those computations yield locations of several corresponding image features before and after the movement that accounts for the differences in the two images. Denote the positions of those features before the move, i.e., in the first image M, as $(x_0,y_0)$, $(x_1,y_1)$, $(x_2, y_2)$, . . . and the positions of the corresponding features after the move, i.e., in the second image M', as $(x'_0,y'_0)$, $(x'_1,y'_1)$, $(x'_2,y'_2)$, . . . . Using that data, one can solve equation (5) for S (perhaps by way of equation (6) if exactly three features are used).

If less than three matching features are known, then a transformation is still possible but it would be constrained to have fewer degrees of freedom than a general affine transformation. For example, if only one point is valid, the images can still be aligned if motion can be approximated as pure translation, i.e., $s_1 = s_4 = 0$ and $s_2 = s_3 = 1$ but $s_5$ and $s_6$ could be non-zero.

Given the matrix S, the next step is to apply it, via one of equations (2)-(4), to all of the points (or only those points of interest) of the second image M' to transform it into alignment with the first image M. The next subsection describes one technique for performing that transformation in a computationally efficient manner.

C. Alignment Transformation

Given some understanding of the spatial relationship between the first and second images, one can align the images with one another so that the aligned images can be combined. In this way alignment of successive two-dimensional images of the same bar code as it is moved in three-dimensional space accomplishes motion compensation. While any suitable transformation can be applied to accomplish the alignment, a preferred transformation is an affine transformation. In its most general case, an affine transformation includes: (i) horizontal and vertical translation; (ii) rotation about an axis normal to the image; and (iii) size changes in vertical and horizontal directions due to depth away from the imager.

FIGS. 7A-7E depict one particular ordering of those steps and represent an alternative to applying the transform matrix S using fewer arithmetic operations by using a method of memory indexing and shifting. Assume without loss of generality that any arbitrary direction is considered as vertical, and its perpendicular direction is taken as horizontal. The terms "horizontal" and "vertical," as used herein, incorporate that assumption. Then, the first step (FIG. 7A) is to offset all pixels in a vertical direction by a vertical offset ($h_2$ pixels). The second step (FIG. 7B) is to offset all pixels in a horizontal direction by a horizontal offset ($h_1$ pixels) and at the same time skew all pixels horizontally, shearing by row ($h_3 \cdot y$ pixels). The second step can be performed as two distinct steps (offset and skew), but they are preferably combined as one step. The third step (FIG. 7C) is to skew all pixels in a vertical direction, shearing by row ($h_4 \cdot x$ pixels). The fourth step (FIG. 7D) is to scale by moving each pixel horizontally ($h_5 \cdot x$ pixels) and vertically ($h_6 \cdot y$ pixels). In gathering these steps, the net result is a reconstructed image (FIG. 7E) with pixels $(x_i, y_j)$ from the image of pixels $(x'_i, y'_j)$:

$$x = h_3 h_5 y' + h_5 x' + h_5(h_1 + h_2 h_3)$$

$$y = h_6(1 + h_4) y' + h_4 h_6 x' + h_6 + h_4 h_6(h_1 + h_2 h_3) \quad (7)$$

Equation (7) has the same form as equation (2). The coefficients $h_i$ defining the stepwise moves can be stated in terms of the affine transform coefficients $s_i$:

$$s_1 = h_3 h_5$$

$$s_2 = h_6(1 + h_3 h_4)$$

$$s_3 = h_5$$

$$s_4 = h_4 h_6$$

$$s_5 = h_5(h_1 + h_2 h_3)$$

$$s_6 = h_2 h_6 + h_4 h_6(h_1 + h_2 h_3) \quad (8)$$

Solving equation (8) for the stepwise parameters $h_i$ in terms of the affine transform coefficients $s_i$ yields $$h_1 = \frac{s_2 s_5 - s_1 s_6}{s_2 s_3 - s_1 s_4} \quad (9)$$

$$h_2 = \frac{s_3 s_6 - s_4 s_5}{s_2 s_3 - s_1 s_4}$$

$$h_3 = \frac{s_1}{s_3}$$

$$h_4 = \frac{s_3 s_4}{s_2 s_3 - s_1 s_4}$$

$$h_5 = s_3$$

$$h_6 = \frac{s_2 s_3 - s_1 s_4}{s_3}$$

Thus, once the affine transform coefficients $s_i$ have been determined, for example, as described in subsection B, equation (9) yields the stepwise parameters $h_i$, $i=1 \ldots 6$. The next step is to perform the transformation using the h parameters. The following sequence of steps, which track FIGS. 7A-7D, is one preferred method for efficiently performing this transformation. The first step is to shift all pixels vertically:

$$x_i \leftarrow x_i', y_j \leftarrow y'_{j+h_2} \quad (10)$$

The second step is to shift all pixels horizontally by an offset plus a skew factor:

$$x_i \leftarrow x_{i+h_1+j \cdot h_3}', y_j \leftarrow y_j' \quad (11)$$

The third step is to shift all pixels vertically by a skew factor:

$$x_i \leftarrow x_i', y_j \leftarrow y_{j+i \cdot h_4}' \quad (12)$$

The fourth step is to shift all pixels horizontally and vertically by scaled amounts:

$$x_i \leftarrow x_{i(1+h_5)}', y_j \leftarrow y_{j(1+h_6)}' \quad (13)$$

In step (13), as stated, the scale factors $h_5$ and $h_6$ are quantities less than one, which represent the factor increase or decrease in size of the object. For example, to decrease the size of the object by 10% of its size in the primed coordinate space, $h_5 = h_6 = 0.1$. Equivalently, one could formulate step (13) without building in the addition of one (i.e., "1+"). In that case, the same example 10% decrease in size would be accomplished by setting $h_5 = h_6 = 1.1$, meaning that the size of the object in the primed coordinate space is 110% the size of the image after execution of the scaling step (13).

Each of steps (10)-(13) may be accomplished, for example, by executing a double nested loop, one loop for each of the variables i and j. Thus, the overall sequence of steps (10)-(13) can be implemented in programming instructions represented by the following pseudocode:

```
LOOP i = 0...n-1
    LOOP j = 0...m-1
        M_A(i,j) = M'(i,j+h_2)
    END LOOP j
END LOOP i
LOOP i = 0...n-1
    LOOP j = 0...m-1
        M_B(i,j) = M_A(i+h_1+j*h_3,j)
    END LOOP j
END LOOP i
LOOP i = 0...n-1
    LOOP j = 0...m-1
        M_C(i,j) = M_B(i,j+i*h_4)
    END LOOP j
END LOOP i
LOOP i = 0...n-1
    LOOP j = 0...m-1
        M(i,j) = M_C(i*(1+h_5),j*(1+h_6))
    END LOOP j
END LOOP i
```

The above double nested loops correspond to the operations shown in FIGS. 7A-7D, respectively.

Note that the steps (10)-(13), FIGS. 7A-7D, and the corresponding double-nested loops in pseudocode above represent just one particular ordering and grouping of steps to accomplish an affine transformation. A fully general affine transformation may be implemented by different orderings and/or combinations of the fundamental components: translation, rotation, and scaling. Furthermore, special cases of an affine transformation can be implemented by performing less than all of those steps, as might be necessary when less than three matching features are found or when simplifying assumptions can be made to disregard some of those steps.

To facilitate calculating speed in implementing steps (10)-(13), FIGS. 7A-7D, or the corresponding double-nested loops in pseudocode above, two tables (presented below in illustrative form as Table 1 and Table 2) can be pre-computed to allow indexes to be looked up quickly. Table 1 stores the results of the calculations performed on the horizontal index/coordinate (i), while Table 2 stores the results of the calculations based on the vertical index/coordinate (j).

TABLE 1

Pre-Computed Horizontal Index/Coordinate Calculations

| i | $i + h_1$ | $i \cdot h_4$ | $i \cdot (1 + h_5)$ |
|---|---|---|---|
| 0 | $h_1$ | 0 | 0 |
| 1 | $1 + h_1$ | $h_4$ | $1 + h_5$ |
| . | . | . | . |
| . | . | . | . |
| . | . | . | . |
| m − 1 | $m − 1 + h_1$ | $(m − 1) \cdot h_4$ | $(m − 1) \cdot (1 + h_5)$ |

TABLE 2

Pre-Computed Vertical Index/Coordinate Calculations

| j | $j + h_2$ | $j \cdot h_3$ | $j \cdot (1 + h_6)$ |
|---|---|---|---|
| 0 | $h_2$ | 0 | 0 |
| 1 | $1 + h_2$ | $h_3$ | $1 + h_6$ |
| . | . | . | . |
| . | . | . | . |
| . | . | . | . |
| $n - 1$ | $n - 1 + h_2$ | $(n - 1) \cdot h_3$ | $(n - 1) \cdot (1 + h_6)$ |

Tables 1 and 2 may be stored on a computer-readable medium as array data structures. The entries of Tables 1 and 2 can be simple numbers, memory address pointers (fixed or relative), or, for increased calculation speed, indexes against physical memory addresses where the image data are stored. Note that Tables 1 and 2 are merely examples and that many variations are possible. For example, the tables need not be organized column-wise, as shown. In other words, the columns may be rows. To reflect that fact, both the terms "row" and "column," as used herein, mean either a row or a column. As another example, the last columns need not include the built-in "plus one" term for reasons stated above. As yet another example, different sequences of steps can implement the same or similar transformation, and tables corresponding to such transformations are possible.

Preferably, the entries of Tables 1 and 2 are rounded to the nearest integer. Rounding or truncating fractional parts simplifies implementation and is sufficiently accurate for typical bar code reading applications, in which the imaging resolution is at least twice the unit width. If finer resolution is needed from the transformation, then the tables can hold fractional or floating point entries and the assignments in the double-nested loops can be implemented by computing a weighted average of adjacent pixels or interpolation between nearby pixels.

An advantage of pre-computing the index/coordinate calculations is a many-fold savings in calculations to align images thereafter. This calculation savings is explained and illustrated in the following Tables 3 and 4, which compare three methods implementing an affine transform on the basis of the number of arithmetic operations required to implement each method, for a typical full image of size m rows and n columns.

TABLE 3

Arithmetic Operations To Set Up and Execute Affine Image Transform

| Task | Operation | Equation (2) | Matrix | Lookup |
|---|---|---|---|---|
| Compute S | Add | 26 | 26 | 26 |
| Matrix | Multiply | 35 | 35 | 35 |
|  | Divide | 9 | 9 | 9 |
| Compute h | Add | N/A | N/A | 5 |
| Parameters | Multiply |  |  | 5 |
|  | Divide |  |  | 6 |
| Build Lookup | Add | N/A | N/A | $2 \cdot m + 2 \cdot n$ |
| Table | Multiply |  |  | $2 \cdot m + 2 \cdot n$ |
| Align Images | Add | $4 \cdot m \cdot n$ | $6 \cdot m \cdot n$ | $2 \cdot m \cdot n$ |
|  | Multiply | $4 \cdot m \cdot n$ | $9 \cdot m \cdot n$ | N/A |
|  | Indexed R/W | $2 \cdot m \cdot n$ | $2 \cdot m \cdot n$ | $8 \cdot m \cdot n$ |

Table 3 compares the operational budget for three different techniques to accomplish an affine transformation. The first technique is computation of equation (2), which first involves determining the parameters of the S matrix, such as by equation (6) and then computing equation (2) for each of the m·n pixels in the image. Each computation of equation (2) requires four multiplications, four additions, and two additional read/write ("R/W") operations. The second technique in Table 3 is computation of the matrix equation (3), rather than equation (2). Because equation (3) is general and contains some meaningless operations (e.g., multiply by 0 or 1), it is less efficient than equation (2), as the table shows. The final column of Table 3 shows the number of operations to compute the parameters of the S matrix, to compute the h parameters from the s parameters via equation (9), to build lookup tables for the horizontal and vertical indices (e.g., Tables 1 and 2), and then to align the images by read/write operations (e.g., the four double nested loops shown in pseudocode above) using the pre-computed lookup tables. The read/write operation count shown in the table for the "align image" task according to the "table lookup" technique assumes regular memory access operations. If memory transfers can be accomplished using DMA (direct memory access) operations in blocks, further time savings can result.

Table 4, below, presents a numerical example for an image having 760 columns and 480 rows (i.e., m=760 and n=480), where the processing is performed on a microprocessor running at 100 MHz and requiring one cycle to perform an addition including a read operation, four cycles to perform a multiplication or division operation including a read operation, and one cycle to perform an independent read or write operation. As Table 4 shows, the lookup table method offers a speed improvement over the most efficient direct computational methods by a factor greater than two. If shifts are accomplished by DMA block transfers, then the computational speed could increase significantly more.

TABLE 4

Example: Time To Align 760 × 480 Pixel Image

| Operations | Cycles/Oper | Equation (2) | Matrix | Lookup |
|---|---|---|---|---|
| Total Adds | 1 | 1,459,226 | 2,188,826 | 732,111 |
| Total Multiplys | 4 | 1,459,235 | 3,283,235 | 2,520 |
| Total Divisions | 4 | 9 | 9 | 15 |
| Total R/Ws | 1 | 729,600 | 729,600 | 2,919,582 |
| µP cycles |  | 8,025,838 | 16,051,168 | 3,661,833 |
| Time (msec) |  | 80 | 161 | 37 |

D. Example: Beverage Can Bar Code

Figure 8:
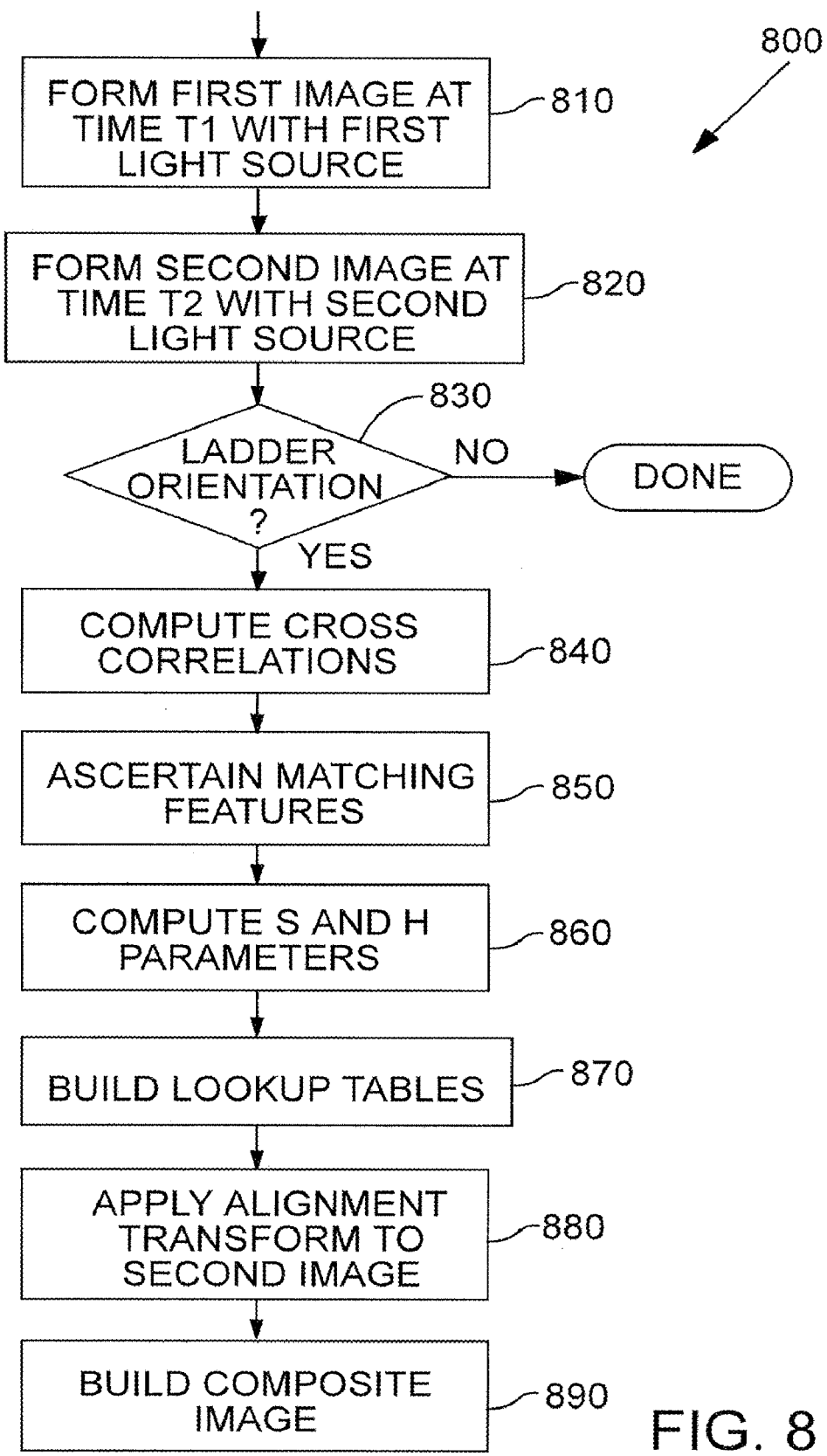
FIG. 8 is a flowchart of a method according to one embodiment.

The cross-correlation feature selection/recognition and table-lookup image alignment techniques described in the previous sections have been applied to successfully read a label on a shiny beverage can, as will be explained with reference to FIG. 8, which is a flowchart of a method 800. To address the problems caused by specular glare, the bar code is illuminated by two light sources at two different times to form two different images. As indicated by step 810, one light shines from a first location, such as above the imager, and can result in a first washed-out unreadable area, such as in the upper half of a first image. A second light shines from a second direction, such as below the imager, and creates an unreadable area in a different region of the target, such as in the lower half of the bar code in a second image. The time relationship between the two images is immaterial. Without loss of generality, assume that one of the images is the first image M (e.g., FIG. 1) and the other of the two images is the second image M' (e.g., FIG. 2). The first image M may have been formed before or after the second image M', and the images need not be consecutively formed by the imager, although that is typically the case. To address the problems caused by motion of the can between the two images, the method 800 aligns the two images, as next described.

Prior to proceeding, it is useful to consider the orientation of the bar code on the label. If the bar code is oriented in a "picket fence" orientation, it is likely that one of the two images will be readable even with a washed-out area in either the top or bottom half of the bar code because a full virtual scan line can be read across the entire bar code in the non-washed-out half. Typically, the image alignment techniques described herein are applied to bar codes in a "ladder" orientation, that is, the alternating bar-space pattern runs vertically in this example, such that a washed-out region prevents decoding of the entire bar code. Ultimately, the composite linear bar code label need only be accurate along a path normal to the bar code lines (major axis). As long as the major axis is aligned, there may be significant alignment error along the minor axis without decreasing readability. Also, the major axis contains a detailed structure useful for feature recognition. Therefore, step 830 of the method 800 preferably determines which axis has the strongest point feature detail and determines whether that indicates a ladder orientation to a degree that likely requires alignment of the two images to yield a readable composite image. For example, an autocorrelation analysis at a small number of grid points can identify the major axis. Subsequent steps can be conducted relative to that axis, if necessary.

Figure 5:
FIGS. 5 and 6 are replicas of the pictures of FIGS. 1 and 2, respectively, with overlaid line segments illustrating where cross correlations are performed, according to one embodiment.
Figure 6:
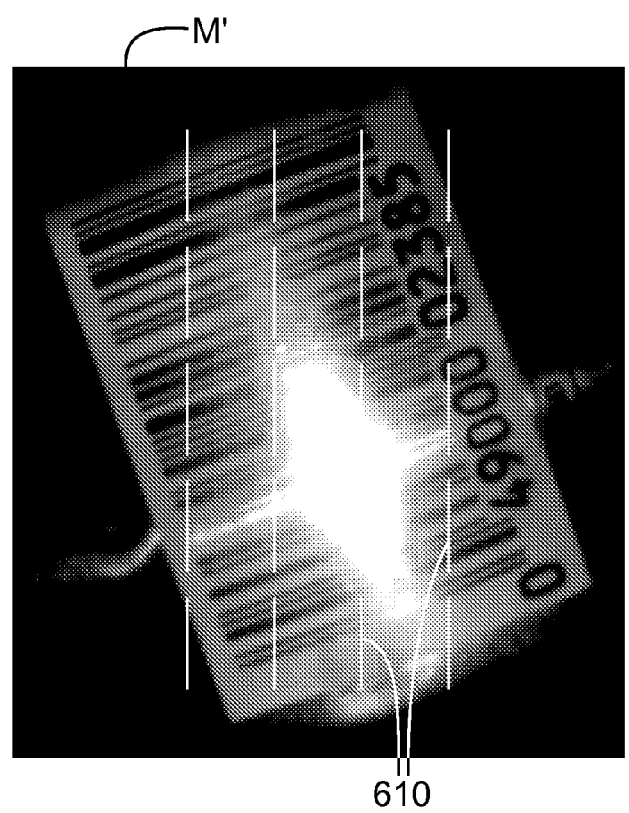
Figure 7A:
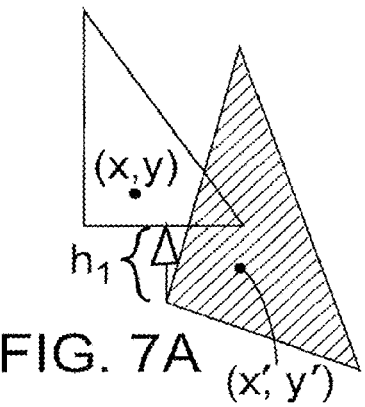
FIG. 7A is a pictorial diagram showing offsetting pixels in a vertical direction, according to one embodiment.
Figure 7B:
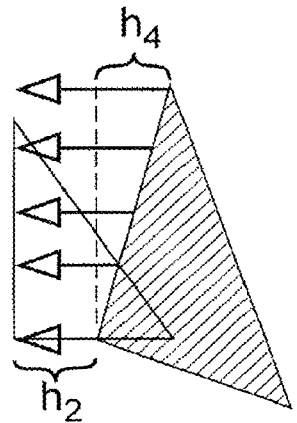
FIG. 7B is a pictorial diagram showing offsetting and skewing pixels in a horizontal direction, according to one embodiment.
Figure 7C:
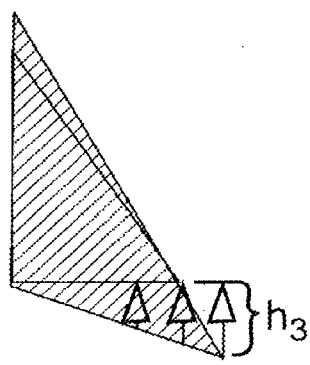
FIG. 7C is a pictorial diagram showing skewing pixels in a vertical direction, according to one embodiment.
Figure 7D:
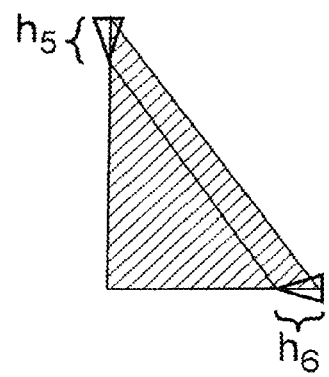
FIG. 7D is a pictorial diagram showing horizontal and vertical scaling, according to one embodiment.
Figure 7E:
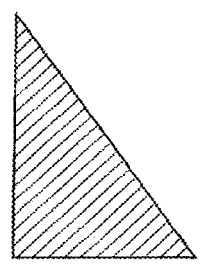
FIG. 7E is a pictorial diagram showing aligned pixel images, according to one embodiment.

Next, the method 800 determines parameters of a transformation mapping between the first and second images, preferably by performing feature selection/recognition as explained in section C above. That preferably includes computing (step 840) one or more cross-correlations between the two images to ascertain (step 850) matching features and their relative displacements. The correlation regions are preferably grids of short one-dimensional vertical line segments 510/610, as shown in FIGS. 5 and 6 on the two images; however, the other patterns of one-dimensional lines are possible. For example, crisscross patterns of virtual scan line paths can be utilized. A good pattern has several paths substantially in the direction of the major axis of the bar code, spread out over the direction of the minor axis. If the number of valid features exceeds three, a multiple regression using a least-square error fit can be used to factor all points into the estimate for the best transform. Preferably, at least three non-colinear features are ideally found and recognized for each of the horizontal and vertical axes for non-ambiguous alignment. That is, there should be three features where both $\Delta x$ and $\Delta y$ are known. Alternately, there could be three points where only $\Delta x$ is known along with three different points where $\Delta y$ is known. If the number of points is less than three, an estimate may still be made but contain fewer degrees of freedom. For example, if only one point is valid, the images can still be aligned if motion is in pure translation.

The next steps of the method 800 align the images by a transformation, which is preferably an affine transformation. For example, this can be done by computing values for the coefficients $h_1$ through $h_6$, such as by equations (5) through (9), as indicated by step 860, and by performing an image alignment transformation to map the second image M' into alignment with the first image M. The transformation is preferably an affine transformation, and it is preferably implemented using pre-computed lookup tables, such as the ones described in section B above. That table-based affine transformation technique is illustrated in FIG. 8, in which a step 870 represents building of the lookup tables and a step 880 represents applying the alignment transformation to the second image.

When reading a shiny beverage can, the steps 870 and 880 can be simplified because the h parameters, and thus the lookup tables, can be simplified compared to a general two-dimensional image alignment transformation. Because the bar code can be assumed to be oriented with its major axis in the direction in which the two light sources are displaced, motion along the minor axis can be ignored. Thus, three of the coefficients are constant and the other three are simpler to compute over the general two-dimensional bar code application. In particular, the coefficients $s_1$, $s_3$ and $s_5$ are all constant which means that the coefficients $h_1$, $h_3$ and $h_5$ are constant. When fewer than three feature points are used, the number of variable coefficients reduces correspondingly. Consequently, equation (2) becomes:

$$x = x'$$

$$y = s_2 y' + s_4 x' + s_6 \qquad (14)$$

Table 5 summarizes the h parameters used in the structured shifting method:

TABLE 5

| | Affine Transformation Coefficients For Structured Shifting | | | | | |
|---|---|---|---|---|---|---|
| | $h_1$ | $h_2$ | $h_3$ | $h_4$ | $h_5$ | $h_6$ |
| General Case | $\dfrac{s_2 s_5 - s_1 s_6}{s_2 s_3 - s_1 s_4}$ | $\dfrac{s_3 s_6 - s_4 s_5}{s_2 s_3 - s_1 s_4}$ | $\dfrac{s_1}{s_3}$ | $\dfrac{s_3 s_4}{s_2 s_3 - s_1 s_4}$ | $s_3$ | $\dfrac{s_2 s_3 - s_1 s_4}{s_3}$ |
| Pop Can-3 Features | 0 | $\dfrac{s_6}{s_2}$ | 0 | $\dfrac{s_4}{s_2}$ | 1 | $s_2$ |
| Pop Can-2 Features | 0 | $\dfrac{s_6}{s_2}$ | 0 | 0 | 1 | $s_2$ |
| Pop Can-1 Feature | 0 | $s_6$ | 0 | 0 | 1 | 1 |

Finally, the method 800 builds (step 890) a composite image from the two images (one original and one transformed for alignment), preferably by choosing the pixel of minimum brightness at each location between the two images. That results in a composite image with significantly reduced glare, as shown in FIG. 4. The bar code in the composite image can thereafter be decoded. Although the composite image in FIG. 4 shows visible artifacts from each image, because the alignment is not perfect along the minor axis, the alignment appears to be very good along the major axis. Note that the image in FIG. 4 was created using an alignment based on four features and regression to determine $s_2$, $s_4$, and $s_6$ to implement equation (14).

The method 800 contemplates aligning two images that have already been captured. Alternatively, one can utilize the captured image data to predict where the bar code will be in an image taken at a future time. In particular, knowing where the matching features are in two images and the time lapse between the images, allows one to interpolate where the features will be at some future time. When an image is taken at that future time, it can then be aligned with either of the first two images without having to re-compute correlations.

Figure 9:
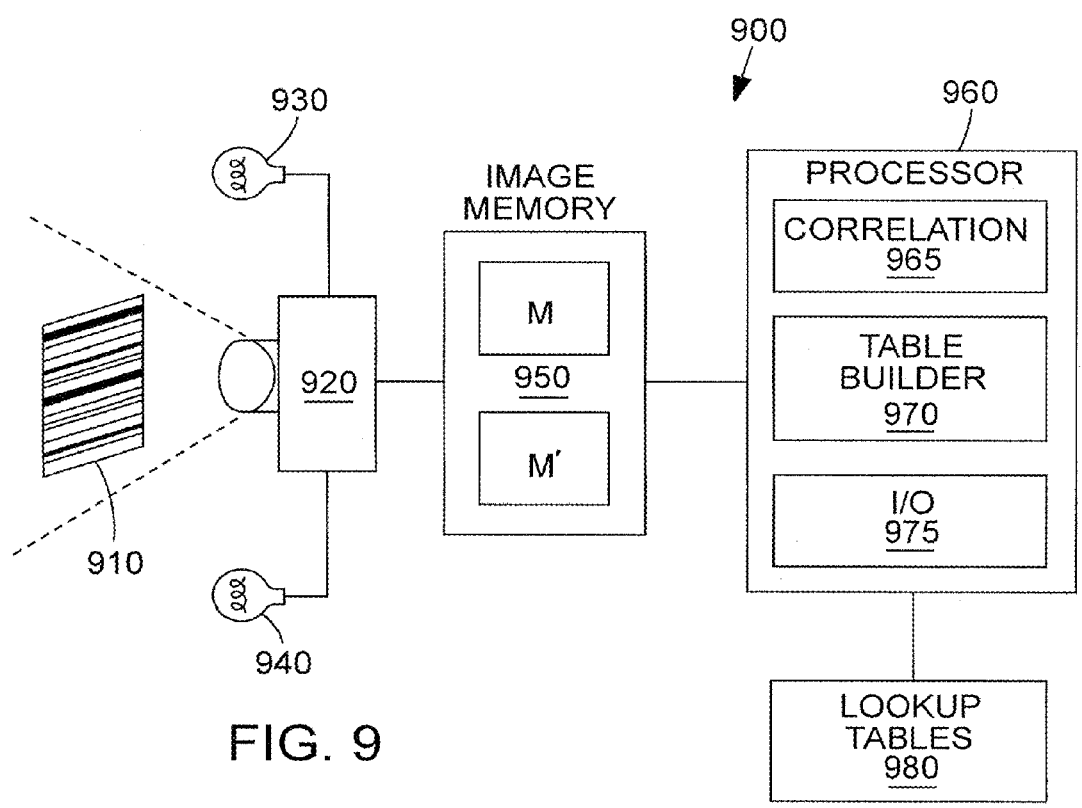
FIG. 9 is a block diagram of a system according to one embodiment.

A system 900, useful for implementing the method 800 and related methods, is shown in block diagram form in FIG. 9. In FIG. 9, a bar code 910 is shown in ladder orientation in the field of view of an imager 920, which is preferably a CCD or CMOS camera. The system 900 includes two light sources 930 and 940, located above and below the imager 920, respectively. The light sources 930 and 940 are preferably flash-type light sources that flash alternately to generate images via the imager 920 with non-overlapping or minimally overlapping washed-out areas on the bar code 910. The images formed by the imager 920 are stored in an image memory 950. As shown, two image maps, files, or the like M and M' correspond to the two light sources 930 and 940, respectively. A processor 960 is connected to read the image memory 960 and to perform processing upon that image data. The processor 960 comprises a number of modules, routines, engines and the like that perform certain tasks. Several such modules are illustrated in FIG. 9, including a correlation module 965, which computes correlations between regions of the images M and M'; a table builder module 970, which construct tables 975 such as the ones described in section C; and an input/output module 975, which performs read/write operations from/to the image memory 950 and the memory where the lookup tables 980 are stored. The processor 960 generates as output one or more of a composite image, virtual scan line taken along the major axis of the composite image, or a bar-space signal decoded from such a virtual scan line. The processor 960 may perform one or more of virtual scan line extraction and signal decoding, or a subsequent processor or circuitry (not shown) may perform those functions.

E. Virtual Scan Lines

In another embodiment, the motion-compensating alignment method may be applied to virtual line segments. When an imaging scanner decodes along virtual line segments, the same approach as used for image transformations with a full two-dimensional raster image alignment may be utilized; however, the alignment can be considerably simpler compared with the full raster alignment method. After the alignment features are extracted, the affine transform need only be applied to the endpoints of each virtual segment. The algorithm that generates the virtual segment can fill in all points between those endpoints. Therefore, instead of thousands of points to transform, only a few points are required.

A latency problem can arise, however, if every set of virtual scan lines requires a separate exposure of the imager. That is, the length of time it takes for computational response for the separate virtual scan lines, including locating endpoints and all the necessary points in between, to align images can become too great. However latency can be reduced in at least two ways. One latency-reducing step is to extract multiple sets of virtual segments with dynamically set endpoint locations from a single captured image. Second, the inertia of the user holding the label is typically great enough so that the label velocity does not change significantly between images, such that stale information can still give good results if applied to the next exposure. Alternately or additionally, running short virtual line segments through the decoding module and performing correlations on the output stream from the decoding module can be more efficient than processing directly on the pixel stream.

In one example it may be assumed that the scanner is limited to capturing virtual line segments and does not actually capture a full raster image at any time. That is, the scanner only captures the pixels along predetermined line segments which have been chosen to give scan coverage over a pattern similar to that provided by a traditional basket-type laser scanners. That approach is an efficient way to get a "bar-signal" to feed directly to the bar code decoders which are expecting this type of sequential information rather than dealing with a two-dimensional matrix of image data. However, that approach poses at least two issues that could limit the ability to compensate for motion between scans: First, the bar code features crossed by a first scan along a particular virtual segment will have moved to a different location by the time a second scan is performed. It is unlikely that the features will line up exactly with any of the pre-determined virtual segments; more likely, the features of interest lie somewhere between virtual segments where no information is available. Second, a typical microprocessor is taxed to most of its capacity just handling the scanning and decoding tasks while it is doing normal scanning, so little time is left to compute and correct for motion even if it had captured the necessary features.

To deal with those two issues, a variant of the motion-compensation method generally follows the following algorithm. First, the variant method captures and decodes all virtual line segments for a first scan over the default virtual scan line pattern. If none of the first scan segments yields a good read then this method retains that image pixel information from all virtual line segments from the first scan, and captures and decodes all virtual line segments for a second scan over the default virtual scan-line pattern. If none of the second scan segments yields a good read, then the method performs the following: (1) Over some subset of the virtual scan lines, perform correlations between the first and second scans to estimate bar code velocity; (2) Use estimated bar code velocity and the known time lapse between the first and second scans to predict how far and in what direction the bar code will move by the time of a third scan; (3) Modify the virtual scan line at pre-selected locations, shifting and rotating as necessary to compensate for the estimated motion; (4) Capture all virtual line segments for a third scan, this time over the modified virtual scan-line pattern; (5) If none of the third scan segments yields a good read, then combine the virtual scan-line images from the second scan with the corresponding images from the third scan using the alignment techniques described above and then decode combined image.

The methods and systems illustrated and described herein can exist in a variety of forms both active and inactive. For example, they can exist as one or more software programs comprised of program instructions in source code, object code, executable code or other formats. Any of the above may be embodied on a computer-readable medium, which include storage devices and signals, in compressed or uncompressed form. Exemplary computer-readable storage devices include conventional computer system RAM (random access memory), ROM (read only memory), EPROM (erasable, programmable ROM), EEPROM (electrically erasable, programmable ROM), flash memory and magnetic or optical disks or tapes. Exemplary computer-readable signals, whether modulated using a carrier or not, are signals that a computer system hosting or running a computer program can be configured to access, including signals downloaded through the Internet or other networks. Concrete examples of the foregoing include distribution of software on a CD ROM or via Internet download. In a sense, the Internet itself, as an abstract entity, is a computer-readable medium. The same is true of computer networks in general.

The terms and descriptions used above are set forth by way of illustration only and are not meant as limitations. Those skilled in the art will recognize that many variations can be made to the details of the above-described embodiments without departing from the underlying principles of the invention. The scope of the invention should therefore be determined only by the following claims—and their equivalents—in which all terms are to be understood in their broadest reasonable sense unless otherwise indicated.

The invention claimed is:

1. A method for aligning a second image of an object at a second time with a first image of the object at a first time, wherein the object experiences motion relative to an imager, which produces the first and second images, between the first and second times, the first and second images being formed of respective sets of pixels arranged horizontally and vertically in a pattern, the method operating on the pixels of the second image by performing a series of operations to affect an affine transformation, the method comprising:
   shifting the pixels of the second image vertically by a constant vertical offset;
   shifting the pixels of the second image horizontally by a constant horizontal offset;
   shearing the second image horizontally by a skew factor;
   shearing the second image vertically by a skew factor;
   scaling the second image horizontally by a horizontal scale factor; and
   scaling the second image vertically by a vertical scale factor,
   wherein at least two of the steps of shifting the pixels of the second image vertically, shifting the pixels of the second image horizontally, shearing the second image horizontally, shearing the second image vertically, scaling the second image horizontally, and scaling the second image vertically are performed by a single table look-up operation, and
   whereby the resulting second image at least approximately aligns with the first image and thereby compensates for the motion.

2. A method according to claim 1, wherein shifting the pixels of the second image vertically by a constant vertical offset is performed by a table look-up operation.

3. A method according to claim 1, wherein shifting the pixels of the second image horizontally by a constant horizontal offset is performed by a table look-up operation.

4. A method according to claim 1, wherein shearing the second image horizontally by a skew factor is performed by a table look-up operation.

5. A method according to claim 1, wherein the step of shifting the pixels of the second image horizontally by a constant horizontal offset and the step of shearing the second image horizontally by a skew factor are performed by a single table look-up operation.

6. A method according to claim 1, wherein shearing the second image vertically by a skew factor is performed by a table look-up operation.

7. A method according to claim 1, wherein scaling the second image horizontally by a horizontal scale factor is performed by a table look-up operation.

8. A method according to claim 1, wherein scaling the second image vertically by a vertical scale factor is performed by a table look-up operation.

9. A method according to claim 1, wherein the object is an optical code.

10. A method according to claim 9, wherein the optical code is a barcode on a shiny surface.

11. A method according to claim 10, wherein the surface is a part of a metallic beverage container.

12. The method of claim 9, wherein the optical code comprises a bar code with line segments and the method further comprises computing cross correlations between line segments of the first image and line segments of the second image.

13. The method of claim 12, wherein the constant vertical offset and the constant horizontal offset are determined by the cross correlations between line segments of the first image and line segments of the second image.

14. The method of claim 12, wherein the line segments are virtual scan line paths.

15. A computer-readable storage device on which are embedded software instructions performing a method for aligning a second image of an object at a second time with a first image of the object at a first time, wherein the object experiences motion relative to an imager, which produces the first and second images, between the first and second times, the first and second images being formed of respective sets of pixels arranged horizontally and vertically in a pattern, the method operating on the pixels of the second image by performing a series of operations to affect an affine transformation, the method comprising:
   shifting the pixels of the second image vertically by a constant vertical offset;
   shifting the pixels of the second image horizontally by a constant horizontal offset;
   shearing the second image horizontally by a skew factor;
   shearing the second image vertically by a skew factor;
   scaling the second image horizontally by a horizontal scale factor; and
   scaling the second image vertically by a vertical scale factor,
   wherein at least two of the steps of shifting the pixels of the second image vertically, shifting the pixels of the second image horizontally, shearing the second image horizontally, shearing the second image vertically, scaling the second image horizontally, and scaling the second image vertically are performed by a single table look-up operation, and
   whereby the resulting second image at least approximately aligns with the first image and thereby compensates for the motion.

16. A computer-readable storage device on which are embedded:
   a first table in which are stored horizontal pixel indices for use in performing an affine transformation upon an image formed of pixels indexed horizontally and vertically in a rectangular pattern, the first table having a first row/column having entries of the form $i+h_1+i*h_3$, a second row/column having entries of the form $i+i*h_5$, and a third row/column having entries of the form $i*h_4$, where i represents an input horizontal pixel index, and $h_1$, $h_3$, and $h_5$ are horizontal offset, skew, and scale factors, respectively, of the affine transformation; and a second table in which are stored vertical pixel indices for use in performing the affine transformation upon the image, the second table having a first row/column having entries of the form $j+h_2$, a second row/column having entries of the form $j+j*h_4$, and a third row/column having entries of the form $j*h_6$, where j represents an input vertical pixel index, and $h_2$, $h_4$, and $h_6$ are vertical offset, skew and scale factors, respectively, of the affine transformation.

* * * * *

UNITED STATES PATENT AND TRADEMARK OFFICE
CERTIFICATE OF CORRECTION

PATENT NO. : 8,181,876 B2
APPLICATION NO. : 12/127685
DATED : May 22, 2012
INVENTOR(S) : Smith It is certified that error appears in the above-identified patent and that said Letters Patent is hereby corrected as shown below:

In the Specification:

Column 7:
Lines 30-35:

Please replace equation 2 with --
$$\begin{aligned} x &= s_1 y' + s_3 x' + s_5 \\ y &= s_2 y' + s_4 x' + s_6 \end{aligned} \quad (2)$$
--.

Column 9:
Lines 3-6:

Please replace equation 7 with --
$$\begin{aligned} x &= h_3 h_5 y' + h_5 x' + h_5(h_1 + h_2 h_3) \\ y &= h_6(1 + h_3 h_4) y' + h_4 h_6 x' + h_2 h_6 + h_4 h_6(h_1 + h_2 h_3) \end{aligned} \quad (7)$$
--.

Lines 10-20:

Please replace equation 8 with --
$$\begin{aligned} s_1 &= h_3 h_5 \\ s_2 &= h_6(1 + h_3 h_4) \\ s_3 &= h_5 \\ s_4 &= h_4 h_6 \\ s_5 &= h_5(h_1 + h_2 h_3) \\ s_6 &= h_2 h_6 + h_4 h_6(h_1 + h_2 h_3) \end{aligned} \quad (8)$$
--.

Lines 45-46:

Please replace equation 10 with --
$$x_j \leftarrow x'_j \quad y_j \leftarrow y'_{j+h_2} \quad (10)$$
--.

Signed and Sealed this
Twenty-ninth Day of April, 2014

Michelle K. Lee
*Deputy Director of the United States Patent and Trademark Office*

CERTIFICATE OF CORRECTION (continued)
U.S. Pat. No. 8,181,876 B2

Column 9:
Lines 48-49:

Please replace equation 11 with -- $x_i \leftarrow x'_{i+h_1+j \cdot h_3} \quad y_j \leftarrow y'_j \quad (11)$ --.

Lines 50-51:

Please replace equation 12 with -- $x_i \leftarrow x'_i \quad y_j \leftarrow y'_{j+i \cdot h_4} \quad (12)$ --.

Lines 56-57:

Please replace equation 13 with -- $x_i \leftarrow x'_{i(1+h_5)} \quad y \leftarrow y'_{j(1+h_6)} \quad (13)$ --.